United States Patent [19]

Perreault

[11] 3,723,640

[45] Mar. 27, 1973

[54] METHOD AND APPARATUS FOR RAPIDLY SCANNING A DOCUMENT

[75] Inventor: Donald A. Perreault, Pittsford, N.Y.

[73] Assignee: Xerox Corporation, Stanford, Conn.

[22] Filed: June 19, 1970

[21] Appl. No.: 47,853

[52] U.S. Cl. .................................. 178/6, 178/DIG. 3

[51] Int. Cl. .................................. H04n 7/12

[58] Field of Search .................. 178/DIG. 3, 6.8, 6

[56] References Cited

UNITED STATES PATENTS

| | | | |
|---|---|---|---|
| 3,499,975 | 3/1970 | Arps | 178/DIG. 3 |
| 3,521,241 | 7/1970 | Rumble | 178/DIG. 3 |
| 3,428,744 | 2/1969 | Green | 178/DIG. 3 |
| 2,909,601 | 10/1959 | Fleckenstein | 178/DIG. 3 |
| 3,584,143 | 6/1971 | Gold et al. | 178/DIG. 3 |
| 3,643,016 | 2/1972 | Dattilo | 178/6 |

OTHER PUBLICATIONS

Stocki; Black and White Graphics Transmission IBM Tech. Disc. Bull., Vol. 11 No. 9, February 1969 pg. 1187.

*Primary Examiner*—Robert L. Griffin
*Assistant Examiner*—Joseph A. Orsino, Jr.
*Attorney*—James J. Ralabate, John E. Beck and Irving Keschner

[57] ABSTRACT

A facsimile system wherein each elemental line of an object is scanned rapidly. Lines bearing low resolution information are scanned rapidly once, video and step command signals being transmitted at the end of the scan. Lines containing high resolution information are scanned rapidly twice. A first video signal is transmitted during the first scan and the remainder of the video signal is transmitted during the rescan, the step command signal being transmitted at the end of the rescan.

13 Claims, 9 Drawing Figures

INVENTOR.
DONALD A. PERREAULT
BY Irving Keschner
ATTORNEY

METHOD AND APPARATUS FOR RAPIDLY SCANNING A DOCUMENT

BACKGROUND OF THE INVENTION

Facsimile systems are generally concerned with the transmission of images over a transmission medium by converting graphic information on an original object, such as a document, from optical to electrical form corresponding to brightness variation of light reflected from the document along some predetermined scanning raster. The electrical video information is transmitted over a suitable transmission medium to a receiver which reconverts the signal into brightness or density variations along a corresponding scanning raster onto a copy sheet. It is generally acknowledged that facsimile systems tend to be inefficient methods of transmitting information because raster scanning generally is not an efficient representation of the information content of the original subject. A facsimile transmission medium is capable of transmitting a certain predetermined number of brightness variations in each second, but a typical original will contain extensive black and white areas and signals of low information content are generated while such areas are being scanned, thus resulting in the transmission medium being utilized for a length of time during which it would otherwise be capable of transmitting a large amount of information.

Techniques have been introduced which utilize existing transmission mediums while reducing the length of time required to transmit a given image. For example, U.S. Pat. No. 3,428,744 discloses a technique wherein every elemental line of a document which contains a black image is scanned twice, first with a rapid scan and then with a slow scan during which video signals are transmitted. Lines bearing no black image are scanned rapidly once. The technique disclosed in the aforementioned patent and, in general, the line skipping techniques of the prior art, have two obvious limitations. The first limitation is that two scanning speeds are required which adds to the cost and complexity of the scanning mechanism. Secondly, the transmitter scanner only recognizes white (or blank) lines and lines containing a black image. No provision is made for recognizing a line containing low resolution information. For example, when the transmitter scanner described in the aforementioned patent scans a line containing information of low resolution, the scanned line is rescanned in a slower mode thereby increasing the time required to reproduce a document of acceptable resolution at the receiver.

SUMMARY OF THE INVENTION

The present invention provides method and apparatus for decreasing the transmission time of a document or other original in a facsimile system. In particular, the transmitter and receiver scanning devices are operated at a single velocity. The transmitter scanner is provided with apparatus for determining whether the elemental line being scanned contains high or low resolution information. If low resolution information is detected, the document and copy are advanced during the retrace time of the transmitter scanning head. If high resolution information is detected during the initial transmitter scan, the same line is rescanned at the same velocity. At the end of the rescan, the document and copy are advanced during the retrace time of the transmitter scanning head.

It is an object of the present invention to provide method and apparatus for decreasing the transmission time of documents in a facsimile system.

It is a further object of the present invention to provide simple, compact, inexpensive facsimile apparatus which is capable of rapidly transmitting documents.

It is an additional object of the present invention to provide method and apparatus for decreasing the facsimile transmission time of documents wherein the scanners at the transmitter and receiver are driven at the same velocity.

It is still a further object of the present invention to provide method and apparatus for decreasing the transmission time of facsimile documents wherein the transmitter scanner scans a document line once rapidly when the information detected thereon is low resolution and wherein the scan line is rescanned at the same speed if the information detected on the first scan is high resolution.

DESCRIPTION OF THE DRAWINGS

For a better understanding of the invention as well as objects and further features thereof, reference is made to the following description which is to be read in conjunction with the accompanying drawings and wherein.

DESCRIPTION OF A PREFERRED EMBODIMENT

Figure 1:
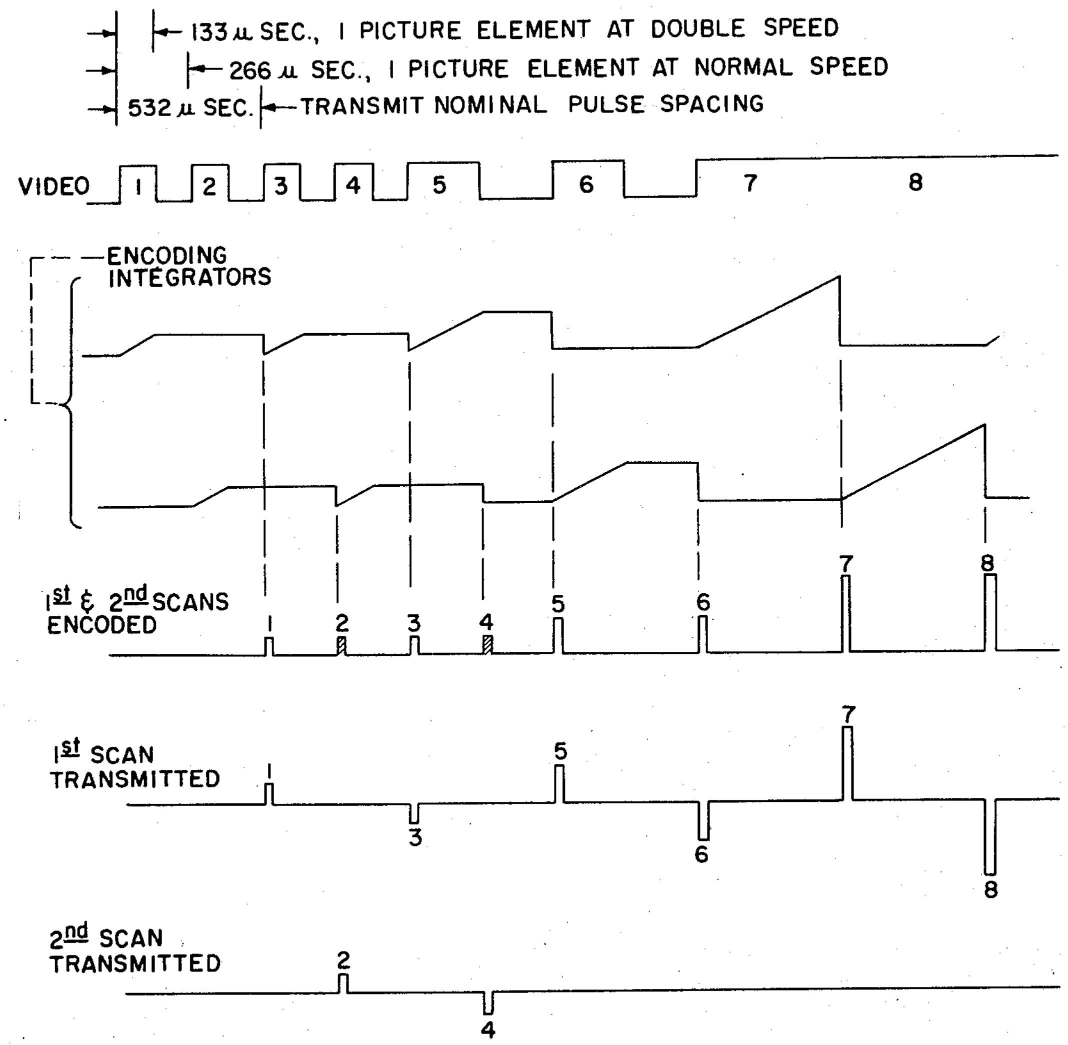
FIGS. 1, 2*a* and 2*b* illustrate the encoding of a two-level video signal by an encoding technique for transmission by the facsimile transmitter of the present invention.

In the semi-encoded facsimile system disclosed in copending application, U.S. Ser. No. 6,869, filed Jan. 29, 1970, pulses are transmitted to indicate the start of a black image (or the continuation of black beyond two picture elements) and the pulse magnitude is an analog of the black image duration (up to two picture elements). The limitation on the speed of transmission is the minimum pulse spacing which can be transmitted through an associated band limited channel without intolerable mutual interference between pulses at the receiver.

Assume that the limit on transmission speed is 4 minutes per document with a guaranteed resolution of 96 lines per inch in the horizontal direction. If a scan line actually consists of image information with resolution no higher than 48 lines per inch then it could be scanned at a rate of 2 minutes per document and would still produce an electrical signal within the specified transmission capability. This fact may be utilized to advantage by recognizing the occurrence of scan lines containing no resolution greater than one-half nominal and to transmit all such lines twice as fast as normal. The proposed system is adaptive in that the net speed-up for a complete document depends on the document itself. The speed-up factor will range between zero, for a document in which all lines contain some "high" resolution information, and 2, for a document in which all lines are "low" resolution. "Low" resolution is defined as half (or less) of the nominal resolution and "high" resolution is defined as anything higher than one-half the nominal resolution.

For purposes of explanation of the technique of the present invention, assume a semi-encoded system designed to transmit 8 ½× 11 inch documents with 96 lines per inch horizontal resolution and 96 lines per inch scan pitch in 4 minutes. The nominal picture element duration is 266 microseconds and pulses are transmitted with a spacing of 532 microseconds. Also assume that the two-level video signal is encoded into pulses whose leading edges correspond in time to white-to-black transitions in the video signal and whose amplitude represents the duration of the video signal black run. A line is scanned and encoded according to the normal semi-encoding rules set forth in the aforementioned copending application except that the scan velocity is doubled, and preencoding pulse stretchers are set for minimum black or white signals of 133 microseconds and the graceful degradation or overload capabilities of the semi-encoded system are adjusted to accommodate these minimums. The resulting pulse train is examined to see if any pulses have occurred closer together than 532 microseconds, the nominal picture element spacing. If the line is entirely low resolution, none will be found. The pulse train is transmitted with alternate pulses inverted in polarity according to the preferred embodiment for semi-encoded transmission. The pulse train is detected and printed in the normal manner except that the printer is running at twice normal speed in synchronism with the scanner. At the end of the line both the scanner and printer proceed to the next line.

If the line contains high resolution information, pulses closer together than 532 microseconds will occur. These pulses are "marked" and eliminated from the pulse train to be transmitted. A detector records the occurrence of any marked pulses during the line and causes both the scanner and printer to rescan the same line. On the second scan, all the marked pulses are transmitted (with alternate pulses inverted in polarity) and the unmarked pulses are inhibited. After the second scan is completed the scanner and printer proceed to the next line.

In this manner all low resolution lines are transmitted by means of a double velocity scan in one-half normal time and all high resolution lines are sent in normal time by means of two double velocity scans. It is to be noted that the scanner and printer scanning mechanisms always operate at a single velocity. The only requirement is that they be able to rescan a line. This is accomplished for example with a stepping mechanism on the document feed which causes the document to advance one scan line during the scan "fly-back"time. The step command is generated at the end of the first scan if no marked pulses have been generated, or at the end of the rescan. It is sent directly to the document feed control at the scanner and is simultaneously transmitted to the printer in the fly-back interval of the transmitted "picture" signal. Encoding a scan which contains high and low resolution waveforms is shown in FIG. 1.

Encoding and transmitting according to the rules described above causes the time dimension of the normal picture element to be halved, becoming in this example 133 microseconds instead of 266 microseconds. Accordingly, the transmitted pulse interval, still 532 microseconds, now represents four picture elements instead of two, and likewise the maximum pulse magnitude represents four picture elements.

Figure 2A:
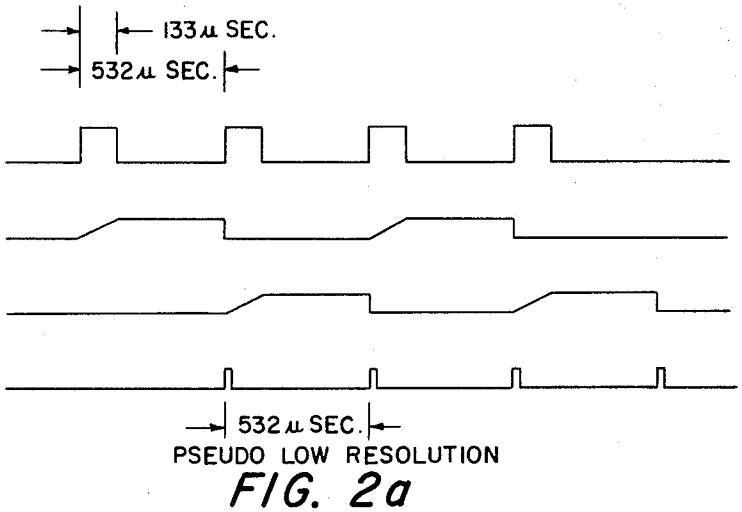

In order to more fully appreciate the effects of the speed-up technique some qualification on the meaning of resolution in semi-encoding is in order. The "resolution" of the semi-encoded signal is not exactly the same as the resolution of the raw video. For example, consider the video waveforms of FIG. 2*a*, a series of single black elements occurring every fourth element time.

Figure 2B:
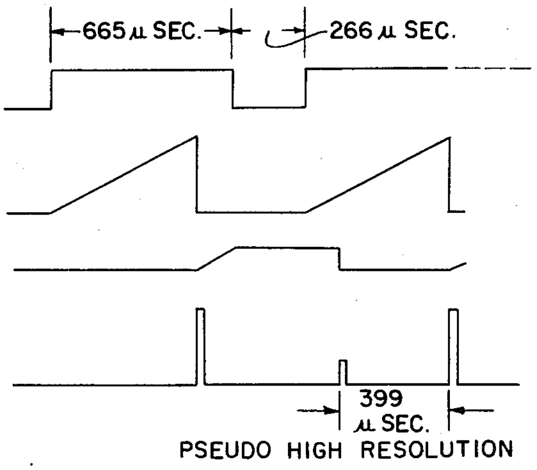

When canned at double speed this would encode as shown. The encoded pulses have the proper spacing and they are all the same magnitude so the mutual interference is tolerable. Therefore this scan would be considered low resolution even though the black runs are only one element in length. Conversely consider the video wave form of FIG. 2*b*. Here a five element run is separated by two elements from another run of four elements or longer. The semi-encoding process creates an artificial transition after four elements (two elements duration at normal scan velocity) and produces a small pulse to represent the one remaining element. This pulse is too close to the following maximum amplitude pulse and would suffer severe interference in transmission. This waveform must therefore be regarded as a high resolution waveform even though the raw video contains no high resolution pattern. Alternatively, it might be elected to transmit the signal and suffer the resulting distortion, which may be of the order of magnitude of a whole picture element. If the scanned image happens to be low resolution in both the horizontal and vertical directions in this region the resulting degradation may be subjectively acceptable. If the scanned image happens to be low resolution in the horizontal direction for this particular scan but high resolution in the vertical direction (i.e. likely to change on adjacent scans) the resulting degradation may not be subjectively acceptable. In the corresponding situation for normal semi-encoding the small pulse represents a half element, the large pulse represents two elements, and the copy degradation has been found to be tolerable. (The situation corresponding to FIG. 2*a* does not occur in normal semi-encoding if pulse stretchers are used to prevent lone one-half element runs.) According to the speed-up rules described above the waveform of FIG. 2*a* would automatically be accepted for transmission on the first scan and the waveform of FIG. 2*b* would automatically cause rescanning of the line.

Figure 3:
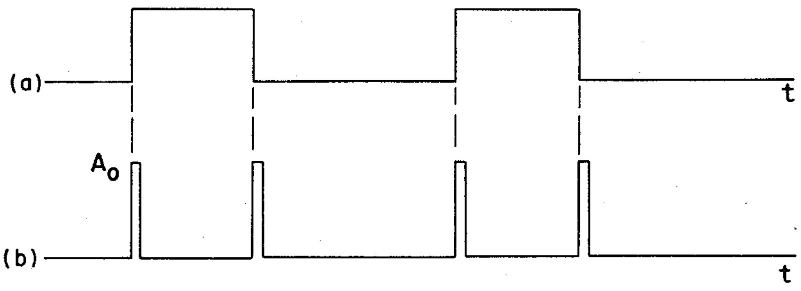
FIGS. 3*a* and 3*b* illustrate the encoding of a two-level video signal by another technique for transmission by the facsimile transmitter of the present invention.

Although the signals to be operated upon by the present invention have been described as "semi-encoded" signals as disclosed in the aforementioned U.S. application Ser. No. 6,869 filed Jan. 29, 1970, it should be noted that in general other processed signals may be utilized. For example, referring to FIG. 3*a*, a typical two-level video signal is illustrated. If we characterize the video transitions as "events," the events may be translated, or encoded, into a series of pulses of amplitude Ao as shown in FIG. 3 *b*, each pulse representing a transition of the two-level video signal. Essentially, the present invention operates on a raw video signal which has been encoded, such as that shown in FIG. 3*b*, so that the bandwidth of individual pulses are independent of the scanning speed although the relative positions of the different pulses in time are dependent on the scanning speed. In other words, the individual signals are transmitted without (or with a minimum of) intersymbol interference. It should be noted that the meaning of "resolution" may be altered depending upon the encoding scheme utilized.

The logic circuits to perform the functions described hereinabove and shown in FIG. 4 will be described with signals which have been semi-encoded as described in the aforementioned copending application.

In order to decrease the susceptability to rescanning caused by "image noise," or to enhance the speed-up at the risk of some image degradation it can be elected to establish a criterion greater than 1 on the number of "-marked" pulses which must occur in order to cause rescanning. This is predicated on the possibility that it may not be necessary to preserve isolated instances of high resolution in order to maintain subjectively acceptable copy quality.

Still another way to decrease the incidence of rescanning is to reduce the pulse spacing criterion, for example from 532 microseconds in the semi-encoding embodiment, to some smaller value which will not cause intolerable interference. Performance would be similar to that in the graceful degradation mode of normal semi-encoding except that the interference effects would be magnified.

Figure 4:
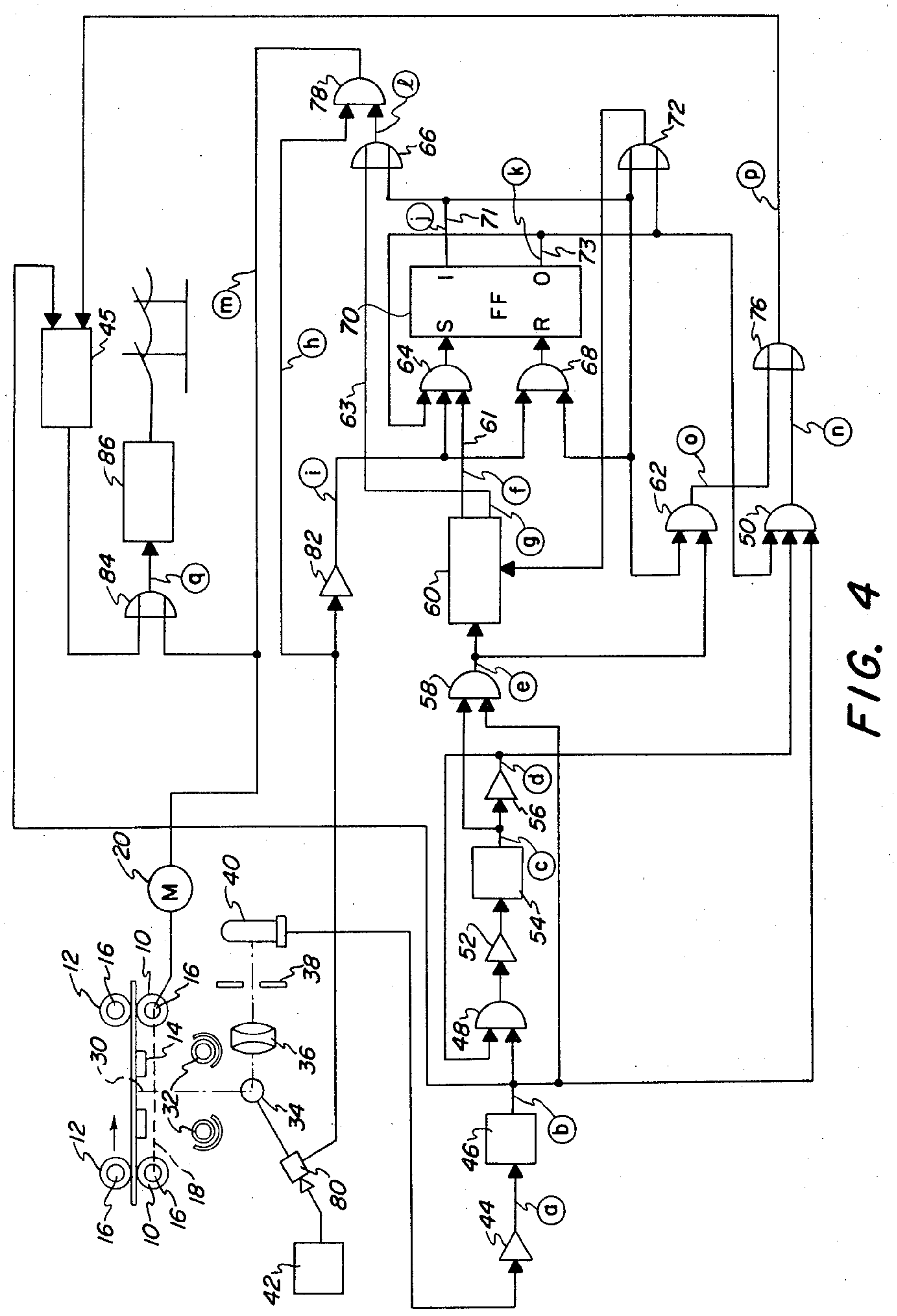
FIG. 4 is a schematic diagram of a facsimile transmitter in accordance with the teachings of the present invention.

Referring now to FIG. 4 there is shown a schematic diagram which illustrates the principles of the present invention. A pair of driving rolls 10 coact with a pair of driven rolls 12 to drive an original, such as a document, over platen 14. Driving rolls 10 are equipped with sprockets 16 so that they may be driven by a chain 18 from stepping motor 20. Stepping motor 20 may be any device which gives a fixed increment of motion for each signal received. It may be, for example, an ordinary electrical solenoid associated with a pawl and ratchet drive, a rotary solenoid associated with a one-way drive clutch, the driving mechanism of a conventional stepping relay, etc. A pair of tubular lamps 32 illuminate the document through a slit 30 and the light reflected from the original is reflected by mirror galvonometer 34 to a lens 36 and through aperture 38 to a photomultiplier 40 or other photoelectric device. A mirror galvonometer is a conventional device used in analog recorders and the like and includes a small mirror which can be rotated through a certain angular displacement in response to an electrical signal. It should be noted that alternate types of scanning systems may be utilized, such as the rotating turret used in the Xerox Telecopier, a facsimile device manufactured by the Xerox Corporation, Rochester, New York. Galvonometer 34, lens 36, and aperture 38 collectively deliver to the photomultiplier 40 a light coming from a given spot lying within slit 30. This sampling spot can be moved back and forth along the slits by actuating galvonometer 34. Waveform generator 42 is provided to operate the galvonometer 34 and generates a waveform having a frequency sufficient to drive galvonometer 34 at a scanning velocity (or sweep frequency) equal to twice the maximum allowable velocity for normal transmission at the nominal system resolution. For example, for vertical resolution on the order of 96 scan lines per inch and a horizontal resolution along the scan lines approximately the same, waveform generator 42 produces a sawtooth signal of approximately 9 cycles per second. Photomultiplier 40 is connected to squaring amplifier 44 which provides a two-level signal corresponding to black or white portions of the original being scanned. The output levels of squaring amplifier 44 should correspond to the "1" and "0" levels of the logic circuitry utilized in the transmitter. The output of squaring amplifier 44 is connected to the semi-encoding apparatus 46 as described in the aforementioned copending application which provides unipolar pulses at the occurrence of each transition from a white to a black level, (the polarity assignment as described in the aforementioned copending application being accomplished in semi-encoder transmission section 45). The output of semi-encoding apparatus 46 is connected to one input of AND gates 48 and AND gate 50 and to one input of semi-encoder transmission section 45. The output of AND gate 48 is coupled to single shot multivibrator 54 via inverter 52. The output of single shot 54 is coupled to the other input of AND gate 48 and to a second input of AND gate 50 via inverter 56. The output of single shot 54 is connected to one input of AND gate 58, the output of semi-encoding apparatus 46 being connected to other input. The output of AND gate 58 is connected to pulse counter 60 and to one input of AND gate 62. The "true" output of pulse counter 60 is connected to one input of AND gate 64, the inverse of the true output being connected to one input of OR gate 66. The outputs of AND gate 64 and AND gate 68 are coupled to the set and reset inputs of flip-flop 70, respectively. The set, or "1," output of flip-flop 70 is connected to the other input of OR gate 66, one input of OR gate 72, one input of AND gate 68, and the other input of AND gate 62. The reset, or "0," output of flip-flop 70 is connected to the other input of OR gate 72, the other input of AND gate 50 and to the second input of AND gate 64. The output of AND gates 50 and 62 are connected to the inputs of OR gate 76, the output of which is coupled to the other input of semi-encoder transmission section 45. The output of OR gate 72 is connected to the reset input of pulse counter 60. One input of AND gate 78 is connected to the output of OR gate 66. The other input of gate 78 is connected to the output galvonometer driving means 80. The galvonometer driving means rotates galvonometer in response to the output from waveform generator 42 and may be arranged to provide an electrical signal when the scan line is ended. Alternately, waveform generator 42 may be arranged to include means for generating a signal during the flyback time of the sawtooth signal which represents the end of a scan. The end of scan signal is coupled to the other inputs of AND gates 64 and 68 via inverter 82. The output of AND gate 78 is coupled to stepping motor 20 and to one input of OR gate 84. The other input of OR gate 84 is connected to the output of semi-encoder section 45.

The output of OR gate 84 is coupled to modem 86 from which it may be transmitted by telephone lines or other means to a remote receiver.

Figure 5:
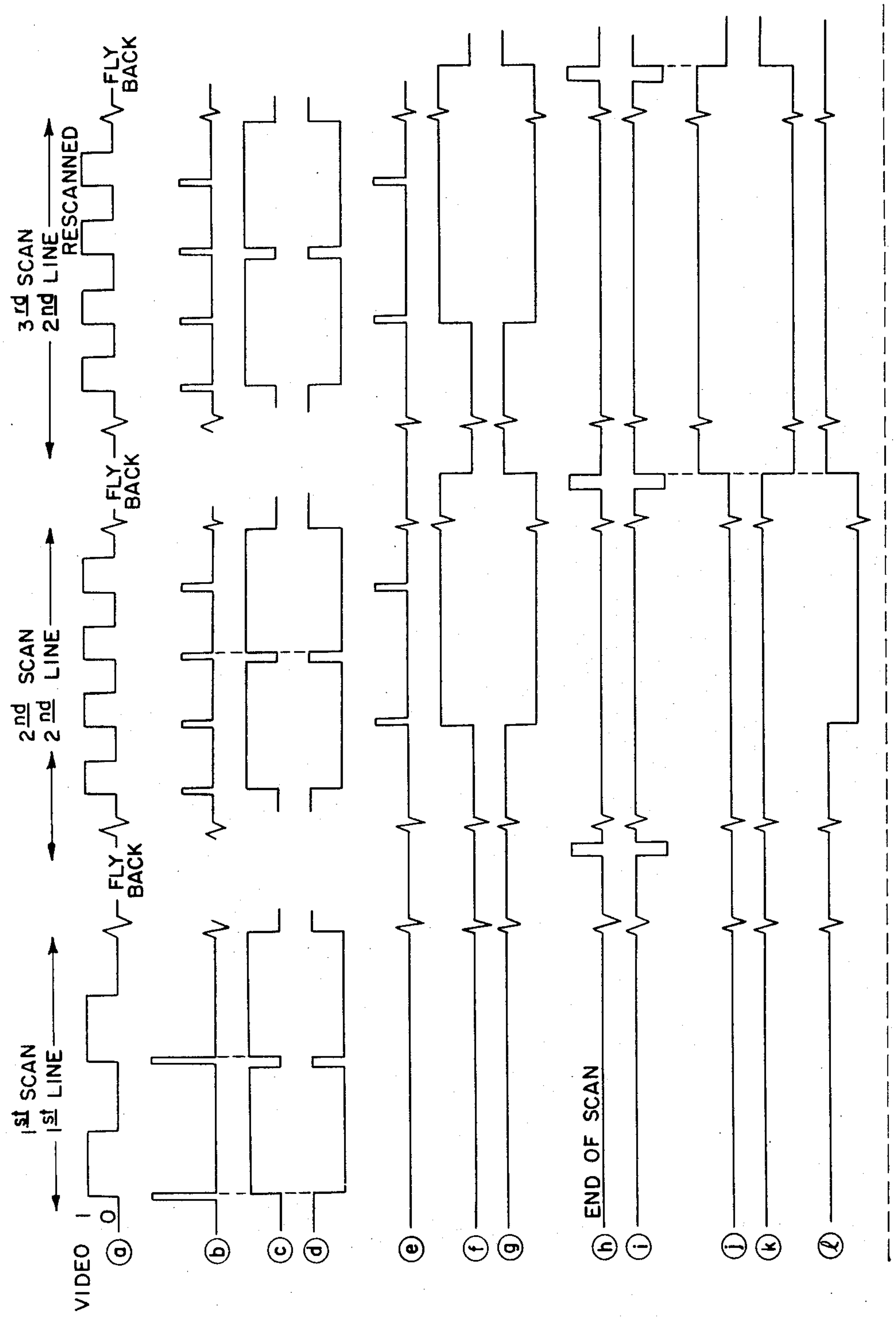
FIG. 5 illustrates the waveforms produced by the transmitter of FIG. 4.
Figure 5:
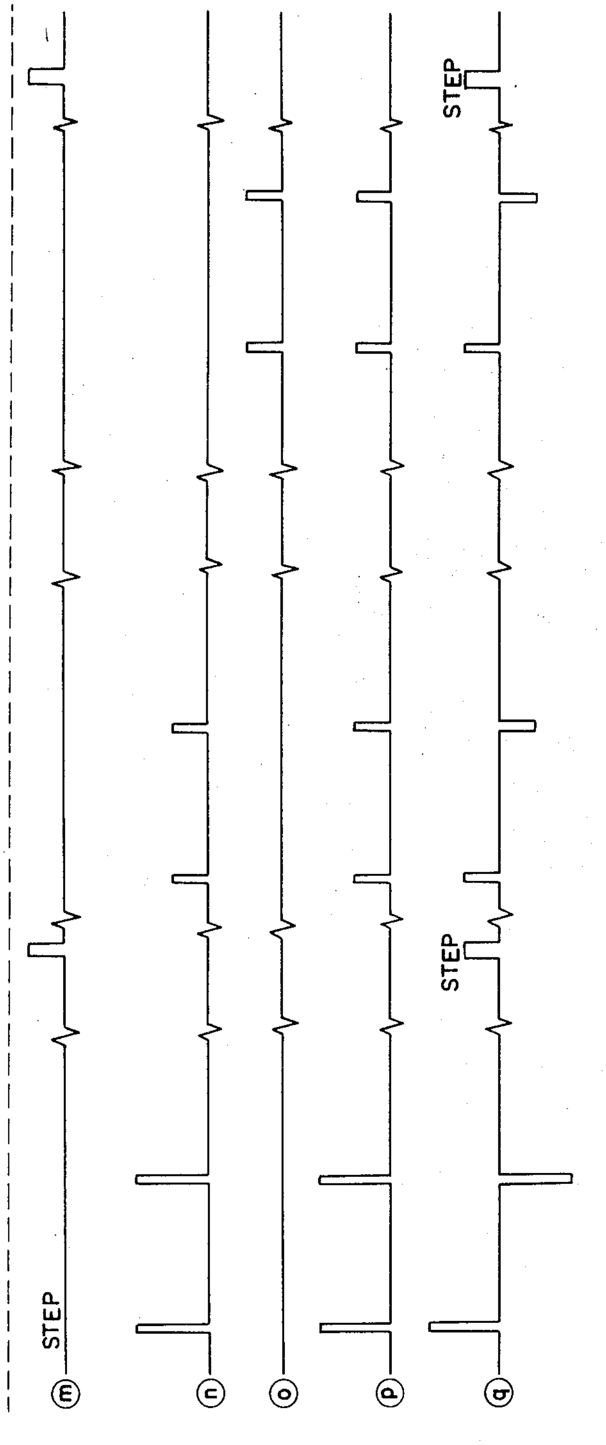

The operation of the facsimile transmitter shown in FIG. 4 will be described with reference to the waveforms shown in FIG. 5. For purposes of explanation, the first two lines of the original being scanned are assumed to have the square two-level shape shown in FIG. 5*a*. Semi-encoder apparatus 46 operates on the two-level input and produces pulses at the occurrence of the white to black transitions as shown in FIG. 5*b*. The output of semi-encoder apparatus 46 triggers single shot multivibrator 54, the period of its output pulse (FIG. 5 *c* ) being selected to correspond to the minimum pulse spacing required for producing copies of acceptable resolution at the receiver. The logical control of single shot multivibrator 54 is such that it cannot be retriggered until its natural time cycle is completed. The output of the processing means 46 is gated with the output of single shot multivibrator 54. As shown in FIG. 5*e*, the output of gate 58 is zero since the pulses shown in FIG. 5*b* occur when the output of the single shot is zero. The true output of counter 60 appearing on lead 61 remains at its initial value of zero, as shown in FIG. 5*f*. The inverse of the true output, appearing on lead 63, is therefore one. It should be noted that flip-flop 70 is initially in the reset state, i.e., the output on lead 71 is zero, as shown in FIG. 5*j*, and the output on lead 73 is logical "1," as shown in FIG. 5*k*. Therefore, a logical "1" appears at the output of OR gate 66 and at the input to AND gate 78, as shown in FIG. 5*l*. When the "end of scan" signal is generated at the end of the scan, as shown in FIG. 5*h*, a signal representing a step command is generated at the output of gate 78, as shown in FIG. 5*m*. The step command signal is fed to the stepping motor 20 whereby the original is advanced one scan line. The step command signal is also transmitted via OR gate 84 and modem 86 to the receiver, causing a stepping motor thereat to advance the copy one scan line. A description of the receiver will be given hereinafter with reference to FIG. 6. As readily observed from FIG. 5, at the time that the encoded pulses (FIG. 5*b*) are coupled to AND gate 50, the other inputs thereto are logical "1" (FIGS. 5*d* and 5*k*). Therefore, the signal appearing at the output of the gate (FIG. 5*n*) is coupled to semi-encoder section 45 via OR gate 76. Semi-encoder section 45 operates on the video pulses before transmission to the receiver in accordance with the output from OR gate 76. During the first scan the video pulses are transmitted to the receiver. During the second scan, or the first scan of the second line, the "unmarked" video pulses are transmitted and during the second scan of the second line, the marked pulses are transmitted to the receiver. The composite transmitted signal is shown in FIG. 5*q*.

After the first line is scanned, the original and copy are advanced one scan line. As shown in FIG. 5*a*, the second line contains four encoded pulses. The encoded pulses are gated in AND gate 58 with the output of single shot 54 triggered by the encoded pulses. As shown in FIGS. 5*b* and *c*, the second and fourth encoded pulses occur when the output of the single shot is at logical "1." Therefore, an output (FIG. 5*e*) is generated by AND gate 58. Counter 60 produces an output when the number of marked pulses exceeds some threshold. In the present illustration, the threshold is one pulse. It is to be noted that in order to decrease the susceptability to rescanning caused by image noise, or to enhance the speed-up at the risk of some image degradation it can be elected to establish a threshold greater than one on the number of marked pulses which must occur in order to cause rescanning. This is predicated on the possibility that it may not be necessary to preserve isolated instance of high resolution in order to maintain subjectively acceptable copy quality. Still another way to decrease the incidence of rescanning is to reduce the pulse spacing criterion to some smaller value which will not cause intolerable interference. For a counter threshold of one pulse, an output is generated on lead 61 (FIG. 5 *f*) on the occurrence of the second encoded pulse. If the threshold is not exceeded during the second scan, flip-flop 70 remains reset and the end of scan signal generates a step command. The reset state of flip-flop 70 allows any of the pulses appearing at the output of semi-encoding apparatus 46 to be transmitted via gates 50 and 76. However, the inverted output of single shot multivibrator 54 inhibits gate 50 when the second and fourth encoded pulses occur so that they are not transmitted.

As set forth hereinabove, since the threshold has been exceeded, a logical "0" appears on lead 63. Since flip-flop 70 is reset, a logical "0" is transmitted to the input of AND gate 78. Therefore, the end of scan signal is prevented from generating the step command. Instead, the end of scan signal sets flip-flop 70 which resets the pulse counter 60 via OR gate 72. As can be seen from FIGS. 5*b*, *d* and *k*, during the scan the first and third video pulses are transmitted via gates 50 and 76.

The next scan of the second line takes place with flip-flop 70 in the set state. The "1" output on lead 71 allows the output of AND gate 58 to be transmitted via gates 62 and 76, AND gate 58 operating in conjunction with single shot multivibrator 54 to pick out the second and fourth pulses from the pulse train. At the end of this scan, the "1" output on lead 71 enables the step command signal to be transmitted to stepping motor 20 and the receiving stepping motor. At the same time, flip-flop 70 is reset by the signal appearing at the output of inverter 82 (FIG. 5*i*) and the reset signal on lead 73 resets pulse counter 60.

Either the set state of flip-flop 70 or the true state of pulse counter 60 allows the step command to be generated. This prevents the system from stalling on a scan line which generated a spurious pulse within the period of single shot 54 on the first scan but does not generate any such pulses on the rescan, thus failing to operate the pulse counter 60. The composite signal transmitted during the rescan includes the second and fourth video pulses and the step command pulse, as shown in FIG. 5*q*.

The information pulse train shown in FIG. 5*a* has regularly spaced pulses for ease of illustration, but obviously an actual pulse train could be completely random except for the minimum spacing established by the system resolution.

As discussed hereinabove, the actual reduction in transmission time depends on the document being scanned. The speed up factor *F* is given by:

$F$ = Total number of scan lines/(Number of low resolution lines × ½) + (Number of high resolution lines)

For example, if half the total number of lines, $N$, are low resolution then $$F = N/(\tfrac{1}{2}N \times \tfrac{1}{2}) + \tfrac{1}{2}N = 1/(\tfrac{1}{4} + \tfrac{1}{2}) = 1.33$$

which means that if normal document transmission time is 4 minutes, the document transmission time utilizing the present invention would be 3 minutes.

Figure 6A:
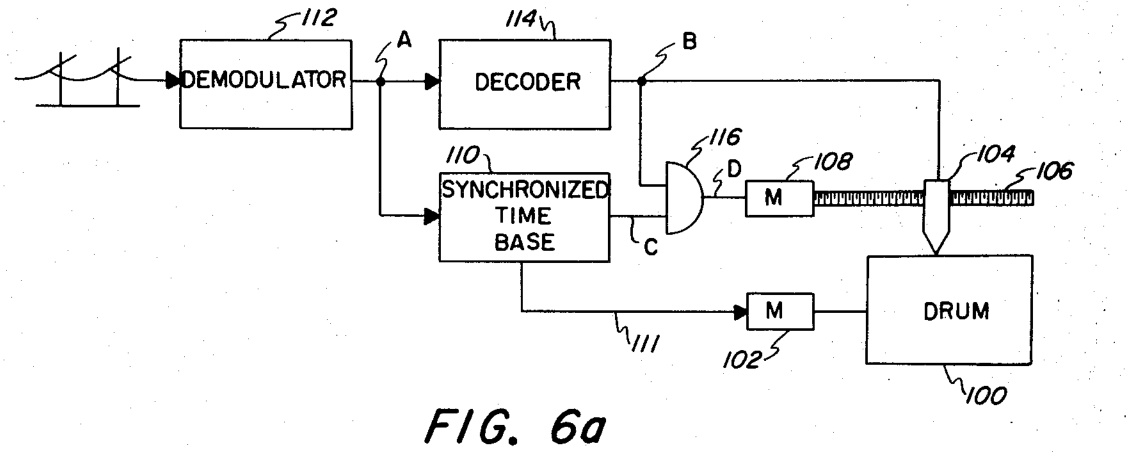
FIGS. 6*a* and *b* are a schematic diagram of a facsimile receiver which may be utilized in the present invention and waveforms associated therewith, respectively.
Figure 6B:
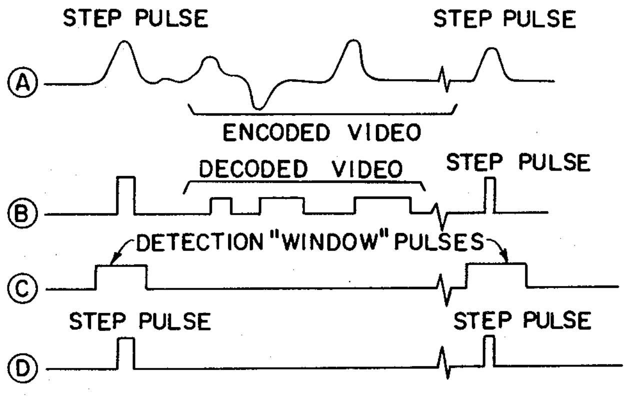

The facsimile transmitter incorporating the present invention must be used in conjunction with a compatible receiver in order to form a useful facsimile transmission system. A simplified receiver is schematically illustrated in FIG. 6. It includes a recording head 104 of any conventional type, operating in conjunction with and writing on a recording medium placed on continuously rotating drum 100 which is driven by a motor 102. Recording head 104 is mounted on a lead screw 106 which is intermittently advanced by a stepping motor 108 which may be the same as stepping motor 20 of FIG. 3. Other conventional facsimile recorder configurations can also be readily adapted for use in the invention. Drum 100 rotates in exact synchronism with waveform generator 42 of FIG. 1 so that the scan rates at the transmitter and receiver are equal. Synchronized time base generator 110 provides a timing signal on lead 111 synchronized with the output of waveform generator 42. The synchronizing means is not part of the present invention and will not be described herein. The encoded pulses are modulated and transmitted to demodulator 112 over a bandlimited channel. The output of demodulator 112, corresponding to bandlimited encoded video and the step pulses is applied to decoder 114. The output B of decoder 114 is the reconstructed black and white video and step pulses and is applied to recording head 104. It should be noted that recording heat 104 will be off drum 100 during fly back time when the step pulse occurs so that the step pulses appearing in output B will not affect a document being reproduced. The output B of decoder 114 is also applied to one input of AND gate 116, the other input of which is coupled to the output C of synchronized time base generator 110. Outputs B and C of decoder 114 and time base generator 110, respectively, are gated in AND gate 116. The output D of AND gate 116 corresponds to the transmitted step pulses which drives stepping motor 108. It should be noted that AND gate 116 may detect the timing and/or step pulses before (bandlimited pulses) or after (reconstructed pulse) decoder 114 as a matter of design convenience.

It should be further noted that the output C of time base generator 110 comprises pulses (or detection "-window" pulses) which coincide with the time of occurrence of the step pulses. In this way, an exact facsimile of a transmitted document is recorded on the recording medium on drum 100, the recording drum rotating at a constant speed.

The invention recited hereinabove provides an improved technique for transmitting documents in a reduced length of time by utilizing simple, reliable and inexpensive facsimile equipment.

What is claimed is:

1. A facsimile transmitter comprising:

a. scanning means for scanning a line across an object to be transmitted and generating an electrical video signal proportional to the intensity of light reflected from said scan line, b. means for advancing said scan line in uniform increments in a direction substantially perpendicular to itself, c. means for encoding said electrical video signal into pulses, said encoded pulses occurring at transitions or some predetermined relationship to the transitions of said electrical video signal, the bandwidth of said encoded pulses being independent of the scanning rate of said scanning means, d. first means responsive to a low resolution encoded video signal generated by said encoding means for operating said advance means at the end of a scan line and for transmitting said low resolution encoded video signal during the time said line is being scanned, and e. second means responsive to a high resolution encoded video signal generated by said encoding means for causing the rescan of a scan line and operating said advance means at the end thereof, a selected portion of said high resolution encoded video signal being transmitted during the first scan of said line and the remainder of said high resolution encoded video signal being transmitted during the rescan of said line.

2. The facsimile transmitter as defined in claim 1 wherein said high resolution encoded video signal comprises pulses spaced less than a minimum pulse spacing and wherein said low resolution encoded video signal comprises pulses having a spacing equal to or greater than said minimum pulse spacing, the portion of said high resolution encoded video signal transmitted during said first scan corresponding to pulses having a spacing equal to or greater than said minimum pulse spacing, the remainder of said high resolution encoded video signal transmitted during said rescan corresponding to pulses also having a spacing equal to or greater than said minimum pulse spacing.

3. The facsimile transmitter as defined in claim 2 further including means for adjusting said second responsive means whereby it is operative only for a predetermined number of occurrences of high resolution information in said encoded video signal.

4. The facsimile transmitter as defined in claim 2 wherein the minimum pulse spacing is selected so that said encoded video signal is transmitted through an associated transmission channel to a receiver whereat a copy of the object of a predetermined resolution is reproduced.

5. A facsimile transmitter comprising:

a. scanning means for scanning a line across an object to be transmitted and generating an electrical video signal proportional to the intensity of light reflected from said scan line, b. means for advancing said scan line in uniform increments in a direction substantially perpendicular to itself, c. means for encoding said electrical video signal into pulses, said encoded pulses occurring at transitions or some predetermined relationship to the transition of said electrical video signal, the bandwidth of said encoded pulses being independent of the scanning rate of said scanning means, d. first means responsive to a low resolution encoded video signal generated by said encoding means for operating said advance means at the end of a scan line and for transmitting said low resolution encoded video signal during the time said line is being scanned, and e. second means responsive to a high resolution encoded video signal generated by said encoding means for causing the rescan of a scan line and operating said advance means at the end thereof, a selected portion of said high resolution encoded video signal being transmitted during the first scan of said line and the remainder of said high resolution encoded video signal being transmitted during the rescan of said line, wherein the minimum pulse spacing is selected so that said encoded video signal is transmitted through an associated transmission channel to a receiver whereat a copy of the object of a predetermined resolution is reproduced, the portion of said high resolution encoded video signal transmitted during said first scan corresponding to pulses having a spacing equal to or greater than said minimum pulse spacing, the remainder of said high resolution encoded video signal transmitted during said rescan corresponding to pulses also having a spacing equal to or greater than said minimum pulse spacing.

6. The facsimile transmitter as defined in claim 5 further including means for varying the minimum pulse spacing.

7. A facsimile transmission system comprising:

1. a transmitter comprising:
   a. scanning means for scanning a line across an object to be transmitted and generating an electrical video signal proportional to the intensity of light reflected from said scan line,
   b. means for advancing said scan line in uniform increments in a direction substantially perpendicular to itself,
   c. means for encoding said electrical video signal into pulses, said encoded pulses occurring at transitions or some predetermined relationship to the transitions of said electrical video signal, the bandwidth of said encoded pulses being independent of the scanning rate of said scanning means,
   d. first means responsive to a low resolution encoded video signal generated by said scanning means for operating said advance means at the end of a scan line and for transmitting said low resolution encoded video signal during the time said line is being scanned, and
   e. second means responsive to a high resolution encoded video signal generated by said scanning means for causing the rescan of a scan line and operating said advance means at the end thereof, a selected portion of said high resolution encoded video signal being transmitted during the first scan of said line and the remainder of said high resolution encoded video signal being transmitted during said rescan of said line, wherein said high resolution encoded video signal comprises pulses spaced less than a minimum pulse spacing and wherein said low resolution encoded video signal comprises pulses having a spacing equal to or greater than said minimum pulse spacing, the portion of said high resolution encoded video signal transmitted during said first scan corresponding to pulses having a spacing equal to or greater than said minimum pulse spacing, the remainder of said high resolution encoded video signal transmitted during said rescan corresponding to pulses also having a spacing equal to or greater than said minimum pulse spacing,
2. means for generating a signal indicative of the operation of said transmitter advance means,
3. a receiver comprising:
   a. continuously operating scan means to repetitively scan a recording element at uniform velocity in a line across a recording medium in record relationship therewith,
   b. advance means for intermittently advancing said line in fixed increments in a direction substantially perpendicular to itself,
   c. means for operating said advance means only in response to received signals indicative of the operation of said transmitter advance means,
   d. means for decoding received encoded video signals, and
   e. means for coupling said decoded signals to said recording element for a length of time corresponding to one scan.

8. A method of facsimile transmission comprising the steps of:

a. scanning a line across an object to be transmitted,
b. generating an electrical video signal proportional to the intensity of light reflected from said scan line,
c. encoding said electrical video signal into pulses, said encoded pulses occurring at transitions or some predetermined relationship to the transitions of said electrical video signal, the bandwidth of said encoded pulses being independent of the scanning rate,
d. determining the information content of said encoded video signal and advancing said line in uniform increments in a direction substantially perpendicular to itself and at the end of said scan if said encoded video signal contains low resolution information,
e. rescanning said scan line if said encoded video signal contains high resolution information and advancing said line in uniform increments in a direction substantially perpendicular to itself and at the end of said rescan, and
f. transmitting said encoded video signal during said scan line if the encoded video signal contains low resolution information and transmitting a selected portion of the encoded video signal during the first scan and the remainder during the rescan if the encoded video signal contains high resolution information.

9. The method as defined in claim 8 wherein said high resolution encoded video signal comprises pulses spaced less than a minimum pulse spacing and wherein said low resolution encoded video signal comprises pulses having a spacing equal to or greater than said minimum pulse spacing, the selected portion of said high resolution encoded video signal transmitted during said first scan corresponding to pulses having a spacing equal to or greater than said minimum pulse spacing, the remainder of said high resolution encoded video signal transmitted during said rescan corresponding to pulses also having a spacing equal to or greater than said minimum pulse spacing.

10. The method as defined in claim 9 wherein the number of occurrences of high resolution information in the encoded video signal determines if the scan line is to be rescanned.

11. The method as defined in claim 9 wherein the minimum pulse spacing is selected so that said encoded video signal is transmitted through an associated transmission channel to a receiver whereat a copy of the object of a predetermined resolution is reproduced.

12. A method of facsimile transmission comprising the steps of:

a. scanning a line across an object to be transmitted, b. generating an electrical video signal proportional to the intensity of light reflected from said scan line, c. encoding said electrical video signal into pulses, said encoded pulses occurring at transitions or some predetermined relationship to the transitions of said electrical video signal, the bandwidth of said encoded pulses being independent of the scanning rate, d. determining the information content of said encoded video signal and advancing said line in uniform increments in a direction substantially perpendicular to itself and at the end of a scan if said encoded video signal contains low resolution information, e. rescanning said scan line if said encoded video signal contains high resolution information and advancing said line in uniform increments in a direction substantially perpendicular to itself and at the end of said rescan, and f. transmitting said encoded video signal during said scan line if the encoded video signal contains low resolution information and transmitting a selected portion of the encoded video signal during the first scan and the remainder during the rescan if the encoded video signal contains high resolution information, wherein said high resolution encoded video signal comprises pulses spaced less then a minimum pulse spacing and wherein said low resolution encoded video signal comprises pulses having a spacing equal to or greater than said minimum pulse spacing, the minimum pulse spacing being selected so that said encoded video signal is transmitted through an associated transmission channel to a receiver whereat a copy of the object of a predetermined resolution is reproduced, the selected portion of said high resolution encoded video signal transmitted during said first scan corresponding to pulses having a spacing equal to or greater than said minimum pulse spacing, the remainder of said high resolution encoded video signal transmitted during said rescan corresponding to pulses also having a spacing equal to or greater than said minimum pulse spacing.

13. The method as defined in claim 12 including the step of varying the minimum pulse spacing.

* * * * *